(12) United States Patent
Chien et al.

(10) Patent No.: US 9,362,057 B2
(45) Date of Patent: Jun. 7, 2016

(54) ELECTROLYTE MIXTURE FOR ELECTROLYTIC CAPACITOR, COMPOSITION FOR CONDUCTIVE POLYMER SYNTHESIS AND CONDUCTIVE POLYMER SOLID ELECTROLYTIC CAPACITOR FORMED BY USING THE SAME

(71) Applicant: Industrial Technology Research Institute, Hsinchu (TW)

(72) Inventors: Hung-Chung Chien, Chiayi County (TW); Li-Duan Tsai, Hsinchu (TW); Yi-Chang Du, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 217 days.

(21) Appl. No.: 13/951,469

(22) Filed: Jul. 26, 2013

(65) Prior Publication Data

US 2014/0029166 A1    Jan. 30, 2014

Related U.S. Application Data

(63) Continuation-in-part of application No. 13/740,288, filed on Jan. 14, 2013, now abandoned.

(30) Foreign Application Priority Data

Jul. 26, 2012  (TW) ............................. 101127062 A
Jun. 25, 2013  (TW) ............................. 102122586 A

(51) Int. Cl.
  *H01G 9/028*  (2006.01)
  *H01G 9/025*  (2006.01)
(52) U.S. Cl.
  CPC .............. *H01G 9/028* (2013.01); *H01G 9/025* (2013.01)
(58) Field of Classification Search
  CPC .................................................... H01G 9/025
  See application file for complete search history.

(56) References Cited

U.S. PATENT DOCUMENTS

| 6,206,937 | B1 | 3/2001 | Kudoh et al. |
| 7,116,549 | B2 | 10/2006 | Anzai et al. |
| 7,166,138 | B2 | 1/2007 | Anzai et al. |
| 7,438,259 | B1 | 10/2008 | Piasecki et al. |
| 7,460,358 | B2 | 12/2008 | Biler |
| 7,666,326 | B2 * | 2/2010 | Yoshida et al. ............... 252/500 |
| 7,746,623 | B2 | 6/2010 | Murakami et al. |
| 7,760,488 | B2 | 7/2010 | Breznova et al. |
| 2010/0165546 | A1 * | 7/2010 | Yoshida et al. ............... 361/525 |
| 2010/0271757 | A1 | 10/2010 | Ishikawa et al. |

FOREIGN PATENT DOCUMENTS

| CN | 101040002 |   | 9/2007 |
| CN | 101379138 |   | 3/2009 |
| CN | 101486838 | * | 7/2009 |
| CN | 101752091 |   | 6/2010 |
| CN | 102037063 |   | 4/2011 |
| EP | 1792948 |   | 6/2007 |
| JP | 2001-23437 | * | 1/2001 |
| TW | 200832468 |   | 8/2008 |
| TW | 201021064 |   | 6/2010 |
| TW | 201131601 |   | 9/2011 |

OTHER PUBLICATIONS

Translation for JP 2001-23437, Jan. 26, 2001.*
Translation of CN 101486838, Jul. 22, 2009.*
Hak-Young Woo; et al., "Synthesis and dispersion of polypyrrole nanoparticles in polyvinylpyrrolidone emulsion," Synthetic Metals, Feb. 13, 2010, pp. 588-591.
Liangbing Hu; et al., "Highly conductive paper for energy-storage device," Proceedings of the National Academy of Sciences, Oct. 21, 2009, pp. 1-5.
Zi Wang; et al., "Polythiophene Microspheres Synthesized by Transition Metal Mediated Oxidative Dispersion Polymerization," Journal of Polymer Science Part A: Polymer Chemistry, vol. 48, Issue 22, Nov. 15,2010, pp. 5265-5269.
Athanasios B. Bourlinos; et al., "Aqueous-phase exfoliation of graphite in the presence of polyvinylpyrrolidone for the production of water-soluble graphenes," Solid State Communications, vol. 149, Issues 47-48, Dec. 2009, pp. 2172-2176.
"Office Action of China Counterpart Application", issued on Nov. 16, 2015, p. 1-9, in which the listed references were cited.

* cited by examiner

*Primary Examiner* — Carol M Koslow
(74) *Attorney, Agent, or Firm* — Jianq Chyun IP Office

(57) ABSTRACT

An electrolyte mixture for electrolytic capacitor is disclosed. The electrolyte mixture includes a conductive polymer and a nitrogen-containing polymer. The nitrogen-containing polymer includes a cyclic nitrogen-containing polymer, a polymer with primary amine group, a polymer with secondary amine group, a polymer with tertiary amine group, a polymer with quaternary ammonium group, or a combination thereof.

7 Claims, 4 Drawing Sheets

ELECTROLYTE MIXTURE FOR ELECTROLYTIC CAPACITOR, COMPOSITION FOR CONDUCTIVE POLYMER SYNTHESIS AND CONDUCTIVE POLYMER SOLID ELECTROLYTIC CAPACITOR FORMED BY USING THE SAME

CROSS-REFERENCE TO RELATED APPLICATION

This application is a continuation-in-part application of and claims the priority benefit of a prior application Ser. No. 13/740,288, filed on Jan. 14, 2013, now abandoned. The prior application Ser. No. 13/740,288 claims the priority benefit of Taiwan application serial no. 101127062, filed on Jul. 26, 2012. This continuation-in-part application also claims the priority benefit of Taiwan application Ser. No. 102122586, filed on Jun. 25, 2013. The entirety of each of the above-mentioned patent applications is hereby incorporated by reference herein and made a part of this specification.

BACKGROUND

1. Technical Field

The technical field relates to an electrolyte mixture for an electrolytic capacitor, a composition for conductive polymer synthesis, and a conductive polymer solid electrolytic capacitor.

2. Background

Improving the electrolyte conductivity has long been one of the major topics in the development of an electrolytic capacitor. The electrolyte with a high conductivity can reduce the equivalent series resistance (ESR) of the electrolytic capacitor, so as to provide high-frequency low impedance and high reliability. A conductive polymer has a higher conductivity than an aqueous electrolyte or a solid organic semiconductor complex salt (e.g. tetracyanoquinodimethane (TCNQ) complex salt) used for conventional capacitors, and exhibits an adequate insulating property at high temperature. Besides, the conductive polymer is safe and free of explosion of a liquid capacitor caused by liquid evaporation. Therefore, such conductive polymer has become the mainstream of the solid electrolyte for existing electrolytic capacitors.

The conductive polymer serving as a solid electrolyte was first proposed in U.S. Pat. No. 4,803,596. In the forming method thereof, an anode foil is dipped in a solution of a monomer and an oxidant, and a polymerization is carried out at an adequate temperature. However, the monomer and the oxidant are reacted so quickly that the conductive polymer can not cover the electrode uniformly.

Low yield and high impedance are often observed in the fabrication of a conductive polymer solid electrolytic capacitor. An inhibiting agent such as imidazole or a derivative thereof is added to reduce the reaction rate and improve the properties of the solid electrolytic capacitor. However, such method can be only applied to low/medium voltage solid electrolytic capacitors. The withstanding voltage of high voltage (>50 V) solid electrolytic capacitors cannot be effectively increased with such method, resulting in low yield production.

In recent years, conductive polymer high voltage capacitors have been widely applied in vehicles. The reliability of the conductive polymer high voltage capacitors is poor for some reasons. First, the conductive polymer has poor film properties and is highly brittle. In long-term use, the vibration from the environment causes deformation of the conductive polymer and breakdown of the oxide layer. Besides, the conductive polymer has poor film forming property and therefore is not able to completely cover the surface of the dielectric layer of the capacitor, and thus, the rate of capacitance withdrawing of the solid electrolytic capacitor is reduced. Moreover, when the material of the dielectric layer is crystalline oxide or aluminium oxide formed by anodization, the aluminium oxide layer inside the dielectric layer is inhomogeneous. Therefore, cracks exist at grain boundaries in the dielectric layer so as to cause a leakage current.

In view of the above, solid electrolytic capacitors can overcome the disadvantages of liquid aluminium electrolytic capacitors. However, upon the practical use and test, many drawbacks are still found in the said techniques. A solid electrolyte is used instead of a liquid electrolyte so as to eliminate the poor temperature properties and long-term instability of the liquid. However, a greater leakage current occurs when the solid electrolytic capacitor is operated under high load or high temperature. A short circuit caused by over leakage current is observed if the film forming property cannot be improved. From the test results, the highest withstanding voltage of conventional solid electrolytic capacitors is less than 50 V. Accordingly, attention has been drawn to how to increase the withstanding voltage of a solid electrolytic capacitor.

SUMMARY

The disclosure provides a solid electrolyte mixture. The solid electrolyte mixture includes a conductive polymer and a nitrogen-containing polymer, wherein the nitrogen-containing polymer includes a cyclic nitrogen-containing polymer, a polymer with primary amine group, a polymer with secondary amine group, a polymer with tertiary amine group, a polymer with quaternary ammonium group, or a combination thereof.

The disclosure provides a composition for conductive polymer synthesis. The composition for conductive polymer synthesis includes a monomer, an oxidant, and a nitrogen-containing polymer, wherein the nitrogen-containing polymer includes a cyclic nitrogen-containing polymer, a polymer with primary amine group, a polymer with secondary amine group, a polymer with tertiary amine group, a polymer with quaternary ammonium group, or a combination thereof.

The disclosure further provides a conductive polymer solid electrolytic capacitor. The conductive polymer solid electrolytic capacitor includes the solid electrolyte mixture.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
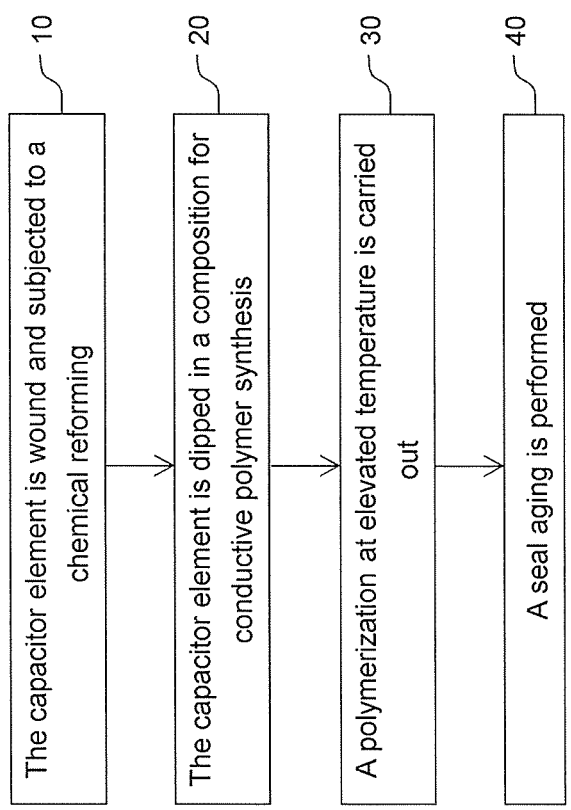
FIG. 1 is a process flow of a method of fabricating a conductive polymer solid electrolytic capacitor according to an exemplary embodiment.

The embodiments of the disclosure provide a solid electrolyte mixture composed of a conductive polymer and a nitrogen-containing polymer. In an exemplary embodiment, the amount of the conductive polymer of the solid electrolyte mixture ranges from 70 wt % to 99.9 wt % and the amount of the nitrogen-containing polymer ranges from 0.1 wt % to 30 wt %.

The conductive polymer includes a thiophene, a thiophene derivative, pyrrole, a pyrrole derivative, an aniline, an aniline derivative, or a combination thereof. The nitrogen-containing polymer includes a cyclic nitrogen-containing polymer, a polymer with primary amine group, a polymer with secondary amine group, a polymer with tertiary amine group, a polymer with quaternary ammonium group, or a combination thereof. The nitrogen-containing polymer exemplarily includes polyvinylpyrrolidone, polyvinylpyridine, or poly (diallydimethyl ammonium chloride). In an embodiment, the weight average molecular weight of the nitrogen-containing polymer ranges from 1,500 to 1,300,000.

The solid electrolyte mixture can be prepared by a composition for conductive polymer synthesis. The composition for conductive polymer synthesis contains a monomer, an oxidant, and a nitrogen-containing polymer.

In an embodiment, a main body (such as a capacitor element) is first dipped in a monomer solution includes a monomer and a nitrogen-containing polymer and then in an oxidant solution containing an oxidant to form a solid electrolyte mixture on the main body. More specifically, the monomer solution includes a nitrogen-containing polymer, a monomer and a solvent. For example, the monomer solution includes 10 wt % to 70 wt % of the monomer, 0.1 wt % to 20 wt % of the nitrogen-containing polymer and the solvent for balance. The oxidant solution includes 10 wt % to 70 wt % of an oxidant and a solvent for balance. In an embodiment, the molar ratio of the monomer to the oxidant (monomer/oxidant) is 0.1 to 1, for example. In another embodiment, the molar ratio of the monomer to the oxidant (monomer/oxidant) is 0.1 to 0.7, for example.

In another embodiment, a main body (such as a capacitor element) is first dipped in a monomer solution formed by a monomer and a solvent and then in an oxidant solution formed by an oxidant and a nitrogen-containing polymer to form a solid electrolyte mixture on the main body. More specifically, the monomer solution includes 20 wt % to 50 wt % of the monomer and the solvent for balance. The oxidant solution includes a nitrogen-containing polymer, an oxidant and a solvent. For example, the oxidant solution includes 20 wt % to 60 wt % of the oxidant, 0.1 wt % to 20 wt % of the nitrogen-containing polymer and the solvent for balance. In an embodiment, the molar ratio of the monomer to the oxidant (monomer/oxidant) is 0.1 to 1, for example. In another embodiment, the molar ratio of the monomer to the oxidant (monomer/oxidant) is 0.1 to 0.7, for example.

In yet another embodiment, a main body (such as a capacitor element) is dipped in a mixed solution formed by a monomer, an oxidant, and a nitrogen-containing polymer to form a solid electrolyte mixture on the main body. The mixed solution includes 20 wt % to 50 wt % of the monomer, 25 wt % to 50 wt % of the oxidant, 0.1 wt % to 10 wt % of the nitrogen-containing polymer and a solvent for balance. In an embodiment, the molar ratio of the monomer to the oxidant (monomer/oxidant) is 0.1 to 1, for example. In another embodiment, the molar ratio of the monomer to the oxidant (monomer/oxidant) is 0.1 to 0.7, for example. The monomer includes a thiophene, a thiophene derivative, a pyrrole, a pyrrole derivative, an aniline, an aniline derivative, or a combination thereof. The monomer of the conductive polymer exemplarily includes 3,4-ethylenedioxythiophene or a derivative thereof, and the derivative has a structure represented by the following formula:

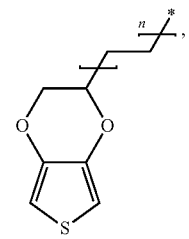

wherein n is an integer from 0 to 5, and wherein the monomer can be used alone or in combination with another monomer having a different structure at a different mixing ratio. The solvent of the monomer solution can be, for example but not limited to, methanol, ethanol, propanol, N,N-dimethylacetamide (DMAc), ethylene glycol, polyethylene glycol, dimethyl sulfoxide (DMSO), tetrahydrofuran (THF), dimethyl fumarate (DMF) or the like, or a mixture including two or more of the said solvents.

The oxidant includes a ferric ion-containing salt. The ferric ion-containing salt exemplarily includes ferric sulfate, ferric p-toluenesulfonate, ferric chloride, ferric nitriate, ferric sulfate, or a combination thereof.

The solvent of the oxidant solution can be, for example but not limited to, methanol, ethanol, propanol, DMAc, ethylene glycol, polyethylene glycol, DMSO, THF, DMF or the like, or a mixture including two or more of the said solvents.

The nitrogen-containing polymer includes a film forming agent. The film forming agent is soluble in the solvent of the monomer solution or in the solvent of the oxidant solution. In an embodiment, the solvent of the monomer solution includes an alcohol or an organic solvent capable of dissolving another monomer. The solvent can be, for example but not limited to, methanol, ethanol, propanol, DMAc, ethylene glycol, polyethylene glycol, DMSO, THF, DMF or the like, or a mixture including two or more of the said solvents. The nitrogen-containing polymer includes a cyclic nitrogen-containing polymer. The nitrogen-containing polymer exemplarily includes polyvinylpyrrolidone, polyvinylpyridine or poly(diallydimethyl ammonium chloride), polyethyleneimine, polyacrylamide, polyamide, a polymer with primary amine group, a polymer with secondary amine group, a polymer with tertiary amine group, a polymer with quaternary ammonium group, or a combination thereof. The weight average molecular weight of the nitrogen-containing polymer ranges from 1,500 to 1,300,000, for example.

According to the foregoing, the composition for conductive polymer synthesis includes a nitrogen-containing polymer, and the conductive polymer polymerized from the monomer in the presence of the nitrogen-containing polymer exhibits good film properties and can serve as a solid electrolyte for a conductive polymer solid electrolytic capacitor. However, the application of the composition for conductive polymer synthesis of the embodiments of the disclosure is not limited to the solid electrolytic capacitor.

FIG. 1 is a process flow of a method of fabricating a conductive polymer solid electrolytic capacitor according to an exemplary embodiment.

Referring to FIG. 1, in an embodiment, a method of fabricating a conductive polymer solid electrolytic capacitor includes implementing a step 10, in which a capacitor element is wound and subjected to a chemical reforming. The method of step 10 includes the following steps. The surface of a metal electrode is oxidized by an electrochemical electrolysis reaction, so as to form an anode with a metal oxide dielectric layer. Another metal electrode is subjected to chemical erosion, so as to form a cathode with a high surface area. Thereafter, the anode with the metal oxide dielectric layer and the cathode are wound together with an interposed separator, so as to fabricate a capacitor element.

Thereafter, a step 20 is implemented to dip the capacitor element in a composition for conductive polymer synthesis. In an embodiment, the forming method of the composition for conductive polymer synthesis includes first dipping the capacitor element in a monomer solution having a nitrogen-containing polymer and then in an oxidant solution such that the monomer is polymerized in the presence of a nitrogen-containing polymer. In another embodiment, the forming method of the composition for conductive polymer synthesis includes first dipping the capacitor element in a monomer solution without a nitrogen-containing polymer and then in an oxidant solution having a nitrogen-containing polymer such that the monomer is polymerized in the presence of a nitrogen-containing polymer. In yet another embodiment, the forming method of the composition for conductive polymer synthesis includes dipping the capacitor element in a solution containing a monomer, an oxidant, and a nitrogen-containing polymer such that the monomer is polymerized in the presence of a nitrogen-containing polymer. The dipping time of the composition for conductive polymer synthesis is 30 minutes, and the temperature is set at 20° C. to 100° C., for example.

Afterwards, a step 30 is implemented to carry out a polymerization at elevated temperature, in which a polymerization reaction is accelerated with increasing temperature, so as to form a conductive polymer on the surface of the dielectric layer. The conductive polymer serves as an electrolyte of the capacitor. The elevated temperature up to 170° C. maximum is provided to ensure a complete polymerization. The temperature is increased at a rate of 5° C. per minute. The polymerization time is 1 hour to 12 hours, for example. The conductive polymer formed from the polymerization can be, for example but not limited to, a polythiophene, a polythiophene derivative, a polypyrrole, a polypyrrole derivative, a polyaniline, a polyaniline derivative, or a copolymer thereof.

Then, a step 40 is implemented to perform a seal aging, in which the capacitor element is encased in a case, sealed and aged. The case is an aluminium case, for example. The capacitor element is sealed with rubber. The solid electrolytic capacitor is thus completed. The solid electrolytic capacitor can have a static capacitance of 10 μF to 400 μF, a 100 kHz equivalent series resistance (ESR) of 7 mΩ to 50 mΩ and a leakage current (LC) of 500 μA to 0.1 μA.

The solid electrolytic capacitor formed by using the composition for conductive polymer synthesis herein can be fabricated with other known methods and the fabricating method thereof is not limited by the said embodiment.

The composition for conductive polymer synthesis herein is beneficial to reduce the interface impedance between the conductive polymer and the oxide film, improve the film forming property of the conductive polymer, and increase the conductivity of the conductive polymer. When the composition is applied to a solid electrolytic capacitor, the properties such as capacitance, reliability, withstanding voltage, heat resistance and lifetime can be effectively increased, and the dissipation factor (DF) value and the 120 Hz equivalent series resistance (ESR) can be decreased.

Example 1

Figure 2B:
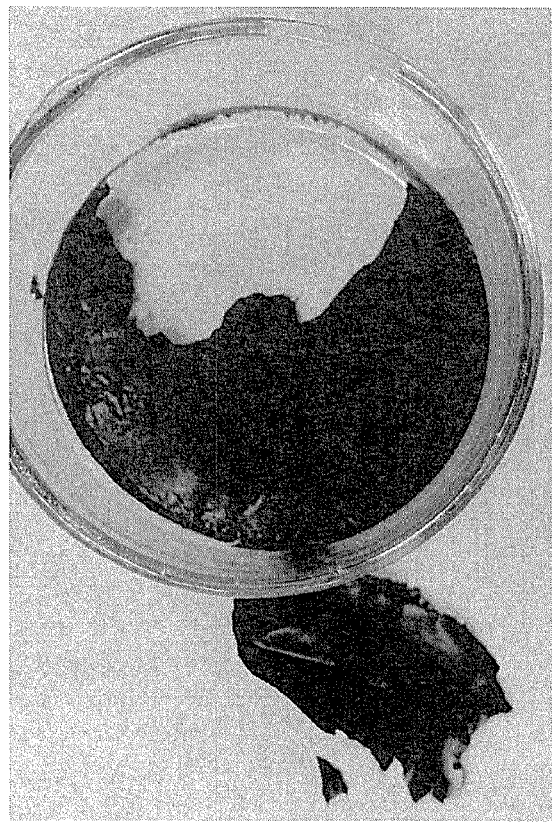
FIG. 2B is the formed conductive polymer image according to Example 1 of the disclosure.

A solution formed by 30 wt % of 3,4-ethylenedioxythiophene (EDOT) monomer was added with polyvinylpyrrolidone (as a nitrogen-containing polymer) in an amount of 5 wt % based on the total weight (100 wt %) of the EDOT monomer and the solvent, and the mixture was poured to a beaker, and dried at 50° C. to 125° C. The image of the EDOT solution in the beaker after drying was shown in FIG. 2A. Thereafter, a 50 wt % of ferric p-toluene-sulfonate solution was poured to the beaker and the temperature was increased at a rate of 5° C. per minute to 170° C., so as to carry out a polymerization reaction. The image of the formed conductive polymer was shown in FIG. 2B.

Comparative Example 1

Figure 3B:
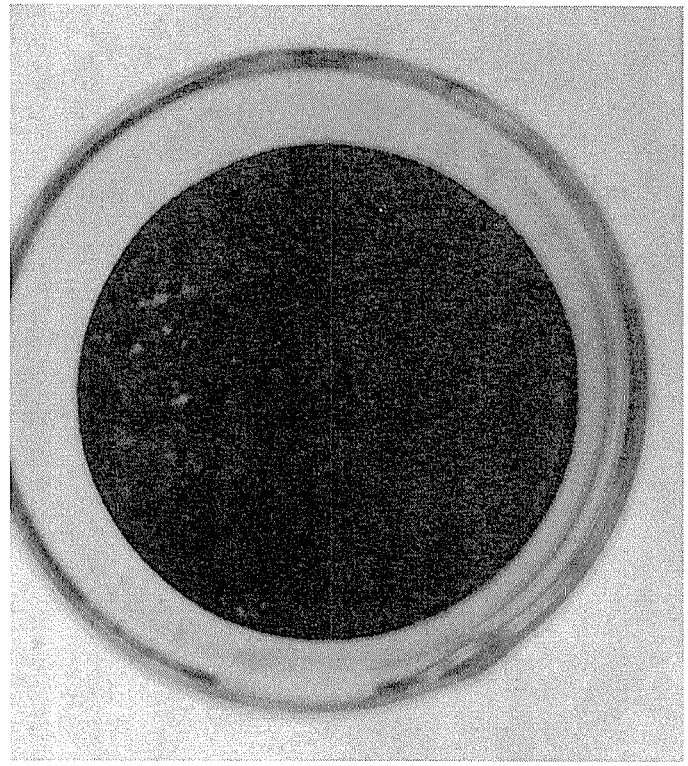
FIG. 3B is the formed conductive polymer image according to Comparative Example 1 of the disclosure.

A 30 wt % EDOT monomer solution without a nitrogen-containing polymer was poured to a beaker, and dried at 50° C. to 125° C. The image of the EDOT solution in the beaker after drying was shown in FIG. 3A. Thereafter, a 50 wt % ferric p-toluene-sulfonate solution was poured to the beaker and the temperature was increased at a rate of 5° C. per minute to 170° C., so as to carry out a polymerization reaction. The image of the formed conductive polymer was shown in FIG. 3B.

Examples 2-5

An anode aluminum foil was subjected to an electrochemical electrolysis reaction at 143 V, so as to form an $Al_2O_3$ dielectric layer on the anode aluminum foil. Thereafter, the anode aluminum foil having the $Al_2O_3$ dielectric layer and a cathode aluminum foil having a high surface area caused by electrochemical corrosion were wound together with an interposed separator, so as to form a capacitor element. Then, the capacitor element was put in an organic acid solution for a chemical reforming of the damaged $Al_2O_3$ dielectric layer. The reforming capacitor element was subjected to a first dipping step in a solution containing 30 wt % of EDOT monomer and different weight ratios of a polyvinylpyrrolidone solution (as a nitrogen-containing polymer (weight average molecular weight of the polymer is 1,300,000)) and then to a second dipping step in a solution containing 45 wt % of ferric p-toluene-sulfonate (Fe(III) p-tosylate), wherein the solutions were listed in Table 1, and a polymerization reaction was then accelerated at elevated temperature up to 170° C. maximum to ensure a complete polymerization. Thereafter, the capacitor element was encased in an aluminum case, sealed with rubber, and aged at 125° C. with an applied voltage of 63 V for 120 minutes. Solid electrolytic capacitors of Examples 2-5 were thus completed. The properties such as static capacitance (C), 100 kHz equivalent series resistance (ESR), leakage current (LC) of the solid electrolytic capacitors of Examples 2-5 were measured and listed in Table 2. The withstanding voltage test results were shown in FIG. 4.

Example 6

The solid electrolytic capacitor of Example 6 was fabricated in accordance with the same procedure as in Example 2, except that the nitrogen-containing polymer was changed to polyvinylpyrrolidone having a weight average molecular weight of 10,000 and the addition amount was controlled at 5 wt %.

Examples 7-9

Each of the solid electrolytic capacitors of Examples 7-9 was fabricated in accordance with the same procedure as in Example 2, except that the nitrogen-containing polymer was changed to Jeffamine® D-2000 polyoxypropylenediamine (produced by Huntsman Co., Ltd) having a molecular weight of 2,000 and the addition amount was controlled at 1 wt %, 2.5 wt %, and 5 wt %, respectively.

Examples 10-11

Each of the solid electrolytic capacitors of Examples 10-11 was fabricated in accordance with the same procedure as in Example 2, except that the nitrogen-containing polymer was changed to poly(acrylamide-co-acrylic acid) having a weight average molecular weight of 1,500 and the addition amount was controlled at 0.2 wt % and 1 wt %, respectively.

Examples 12-13

Each of the solid electrolytic capacitors of Examples 12-13 was fabricated in accordance with the same procedure as in Example 2, except that the nitrogen-containing polymer was changed to poly(diallydimethyl ammonium chloride) having a weight average molecular weight distributed between 200,000 and 350,000 and the addition amount was controlled at 0.2 wt % and 1 wt %, respectively.

Example 14

The solid electrolytic capacitor of Example 14 was fabricated in accordance with the same procedure as in Example 2, except that the nitrogen-containing polymer was changed to polyvinylpyridine having a weight average molecular weight of 60,000 and the addition amount was controlled at 1 wt %.

Comparative Example 2

The solid electrolytic capacitor of Comparative Example 2 was fabricated in accordance with the same procedure as in Example 2, except that a monomer solution without a nitrogen-containing polymer (polyvinylpyrrolidone) was used instead. The properties of the solid electrolytic capacitor of Comparative Example 2 were measured and listed in Table 2. The withstanding voltage test results were shown in FIG. 4.

Example 15

The solid electrolytic capacitor of Example 15 was fabricated in accordance with the same procedure as in Example 2, except that the monomer solution was maintained at 10 wt % and 0.2 wt % of polyvinylpyrrolidone was added to 10 wt % of the oxidant (Fe(III) p-tosylate) solution, as shown in Table 3. The solid electrolytic capacitor of Example 15 was subjected to the capacity property test, and the test results were shown in Table 4.

Examples 16-18

Each of the solid electrolytic capacitors of Examples 16-18 was fabricated in accordance with the same procedure as in Example 15, except that the monomer solution was maintained at 10 wt % and 0.5 wt % of polyvinylpyrrolidone was added to 40 wt %, 50 wt %, and 70 wt % of the oxidant (Fe(III) p-tosylate) solution. The amount of each ingredient was shown in Table 3. The solid electrolytic capacitors of Examples 16-18 were subjected to the capacity property test, and the test results were shown in Table 4.

Comparative Examples 3-4

Each of the solid electrolytic capacitors of Comparative Examples 3-4 was fabricated in accordance with the same procedure as in Example 15, except that polyvinylpyrrolidone was not added to 10 wt % and 40 wt % of the oxidant (Fe(III) p-tosylate) solution. The amount of each ingredient was shown in Table 3. The solid electrolytic capacitors of Comparative Examples 3-4 were subjected to the capacity property test, and the test results were shown in Table 4.

Example 19

The solid electrolytic capacitor of Example 19 was fabricated in accordance with the same procedure as in Example 15, except that the monomer solution was maintained at 50 wt % and 0.5 wt % of JEFFAMINE-D2000 was added to 40 wt % of the oxidant (Fe(III) p-tosylate) solution. The amount of each ingredient was shown in Table 3. The solid electrolytic capacitor of Example 19 was subjected to the capacity property test, and the test results were shown in Table 4.

Comparative Example 5

The solid electrolytic capacitor of Comparative Example 5 was fabricated in accordance with the same procedure as in Example 19, except that JEFFAMINE D-2000 was not added to the oxidant (Fe(III) p-tosylate) solution. The amount of each ingredient was shown in Table 3. The solid electrolytic capacitor of Comparative Example 5 was subjected to the capacity property test, and the test results were shown in Table 4.

Example 20

The solid electrolytic capacitor of Example 20 was fabricated in accordance with the same procedure as in Example 15, except that the monomer solution was maintained at 70 wt % and 1 wt % of Jeffamine® D-2000 polyoxypropylenediamine was added to 70 wt % of the oxidant (Fe(III) p-tosylate) solution. The amount of each ingredient was shown in Table 3. The solid electrolytic capacitor of Example 20 was subjected to the capacity property test, and the test results were shown in Table 4.

Comparative Example 6

The solid electrolytic capacitor of Comparative Example 6 was fabricated in accordance with the same procedure as in Example 19, except that Jeffamine® D-2000 polyoxypropylenediamine was not added to the oxidant (Fe(III) p-tosylate) solution. The amount of each ingredient was shown in Table 3. The solid electrolytic capacitor of Comparative Example 6 was subjected to the capacity property test, and the test results were shown in Table 4.

Examples 21-24

The solid electrolytic capacitors of Examples 21-24 were fabricated in accordance with the same procedure as in Example 2 using different monomer solutions. The amount of each ingredient was shown in Table 5. The solid electrolytic capacitors of Examples 21-24 were subjected to the capacity property test, and the test results were shown in Table 6.

TABLE 1

| | First dipping | | | | | | |
|---|---|---|---|---|---|---|---|
| Example | A (wt %) | B (wt %) | C (wt %) | D (wt %) | E (wt %) | F (wt %) | G (wt %) |
| Example 2 | 30 | 1 | 0 | 0 | 0 | 0 | 0 |
| Example 3 | 30 | 2.5 | 0 | 0 | 0 | 0 | 0 |

TABLE 1-continued

| | First dipping | | | | | | |
|---|---|---|---|---|---|---|---|
| Example | A (wt %) | B (wt %) | C (wt %) | D (wt %) | E (wt %) | F (wt %) | G (wt %) |
| Example 4 | 30 | 10 | 0 | 0 | 0 | 0 | 0 |
| Example 5 | 30 | 20 | 0 | 0 | 0 | 0 | 0 |
| Example 6 | 30 | 0 | 5 | 0 | 0 | 0 | 0 |
| Example 7 | 30 | 0 | 0 | 1 | 0 | 0 | 0 |
| Example 8 | 30 | 0 | 0 | 2.5 | 0 | 0 | 0 |
| Example 9 | 30 | 0 | 0 | 5 | 0 | 0 | 0 |
| Example 10 | 30 | 0 | 0 | 0 | 0.2 | 0 | 0 |
| Example 11 | 30 | 0 | 0 | 0 | 1 | 0 | 0 |
| Example 12 | 30 | 0 | 0 | 0 | 0 | 0.2 | 0 |
| Example 13 | 30 | 0 | 0 | 0 | 0 | 1 | 0 |
| Example 14 | 30 | 0 | 0 | 0 | 0 | 0 | 1 |
| Comparative Example 2 | 30 | 0 | 0 | 0 | 0 | 0 | 0 |

Note:
A: EDOT
B: polyvinylpyrrolidone, Molecular Weight: 1,300,000
C: polyvinylpyrrolidone, Molecular Weight: 10,000
D: JEFFAMINE D-2000, Molecular Weight: 2000
E: poly(acrylamide-co-acrylic acid), Molecular Weight: 1500
F: poly(diallydimethyl ammonium chloride), Molecular Weight: 200,000-350,000
G: polyvinylpyridine, Molecular Weight: 60,000

TABLE 2

| Example | | Yield (%) | Aging (63V) | Capacitance (uF) | 120 Hz ESR (mΩ) | DF (%) | 100 kHz ESR (mΩ) |
|---|---|---|---|---|---|---|---|
| Example 2 | Ave. | 100 | | 28.1 | 1416.7 | 3.00 | 17.68 |
| | Std. | | | 0.53 | 99.0 | 0.18 | 0.44 |
| Example 3 | Ave. | 100 | | 29.3 | 2524.1 | 5.57 | 27.97 |
| | Std. | | | 0.27 | 637.5 | 1.38 | 6.26 |
| Example 4 | Ave. | 100 | | 27.5 | 1819.7 | 3.76 | 17.59 |
| | Std. | | | 0.34 | 281.9 | 0.56 | 1.06 |
| Example 5 | Ave. | 100 | | 11.14 | 38058.0 | 31.67 | 396.90 |
| | Std. | | | 1.07 | 4369.4 | 1.43 | 44.91 |
| Example 6 | Ave. | 100 | | 27.32 | 2772.0 | 5.71 | 25.09 |
| | Std. | | | 0.35 | 186.4 | 0.35 | 1.16 |
| Example 7 | Ave. | 70 | | 23.5 | 5638.1 | 9.98 | 24.91 |
| | Std. | | | 0.55 | 766.2 | 1.18 | 0.86 |
| Example 8 | Ave. | 100 | | 26.4 | 3518.8 | 7.03 | 24.30 |
| | Std. | | | 1.21 | 350.8 | 0.89 | 1.19 |
| Example 9 | Ave. | 100 | | 22.9 | 5598.3 | 9.68 | 33.36 |
| | Std. | | | 0.43 | 329.1 | 0.58 | 1.46 |
| Example 10 | Ave. | 60 | | 25.3 | 4205.3 | 8.00 | 20.62 |
| | Std. | | | 0.88 | 534.0 | 0.83 | 1.04 |
| Example 11 | Ave. | 70 | | 27.1 | 2617.3 | 5.33 | 18.30 |
| | Std. | | | 0.37 | 373.0 | 0.69 | 0.75 |
| Example 12 | Ave. | 60 | | 26.4 | 2229.7 | 4.43 | 19.80 |
| | Std. | | | 0.60 | 379.6 | 0.68 | 1.42 |
| Example 13 | Ave. | 50 | | 25.4 | 8136.5 | 15.60 | 27.65 |
| | Std. | | | 0.35 | 322.2 | 0.59 | 0.73 |
| Example 14 | Ave. | 70 | | 27.9 | 1982.2 | 4.16 | 18.5 |
| | Std. | | | 0.86 | 185.5 | 0.26 | 0.91 |
| Comparative Example 2 | Ave. | 10 | | 23.8 | 7191 | 12.90 | 28.4 |
| | Std. | | | 0 | 0 | 0 | 0 |

Note:
The average and standard deviation were calculated from the test results of 10 capacitors for each example.

TABLE 3

| | First dipping | Second dipping | | |
|---|---|---|---|---|
| Example | EDOT (wt %) | Fe(III) p-tosylate (wt %) | polyvinyl pyrrolidone (wt %) | JEFFAMINE D-2000 (wt %) |
| Example 15 | 10 | 10 | 0.2 | 0 |
| Example 16 | 10 | 40 | 0.5 | 0 |
| Example 17 | 10 | 50 | 0.5 | 0 |
| Example 18 | 10 | 70 | 0.5 | 0 |
| Comparative Example 3 | 10 | 10 | 0 | 0 |
| Comparative Example 4 | 10 | 40 | 0 | 0 |
| Example 19 | 50 | 40 | 0 | 0.5 |
| Comparative Example 5 | 50 | 40 | 0 | 0 |
| Example 20 | 70 | 70 | 0 | 1 |
| Comparative Example 6 | 70 | 70 | 0 | 0 |

TABLE 4

| Example | | Aging (63 V) | Capacitance (uF) | 100 kHz ESR (mΩ) |
|---|---|---|---|---|
| Example 15 | Ave. | | 14.2 | 73.50 |
| | Std. | | 0.74 | 39.10 |
| Example 16 | Ave. | | 21.9 | 22.00 |
| | Std. | | 0.34 | 2.04 |
| Example 17 | Ave. | | 24.2 | 32.34 |
| | Std. | | 0.46 | 3.56 |
| Example 18 | Ave. | | 18.3 | 12.12 |
| | Std. | | 0.44 | 0.31 |
| Comparative Example 3 | Ave. | | 12.1 | 265.44 |
| | Std. | | 0.64 | 42.46 |
| Comparative Example 4 | Ave. | | 21.9 | 37.32 |
| | Std. | | 0.36 | 4.67 |
| Example 19 | Ave. | | 16.5 | 88.00 |
| | Std. | | 0.87 | 5.15 |
| Comparative Example 5 | Ave. | | 14.6 | 94.24 |
| | Std. | | 1.10 | 14.17 |
| Example 20 | Ave. | | 7.0 | 343.20 |
| | Std. | | 0.83 | 69.83 |
| Comparative Example 6 | Ave. | | 4.2 | 418.56 |
| | Std. | | 1.02 | 140.02 |

Note: The average and standard deviation were calculated from the test results of 10 capacitors for each example.

TABLE 5

| | First dipping | | |
|---|---|---|---|
| Example | EDOT (wt %) | 3-methyl-EDOT (wt %) | polyvinyl pyrrolidone |
| Example 21 | 0 | 30 | 5 |
| Example 22 | 10 | 20 | 5 |
| Example 23 | 20 | 10 | 5 |
| Example 24 | 30 | 0 | 5 |

TABLE 6

| Example | | Yield (%) | Aging (63V) | Capacitance (uF) | 120 Hz ESR (mΩ) | DF (%) | 100 kHz ESR (mΩ) | Leakage Current (uA) |
|---|---|---|---|---|---|---|---|---|
| Example 21 | | 100 | Ave. | 19.8 | 10413.2 | 15.54 | 107.75 | 0.8 |
| | | | Std. | 0.75 | 892.6 | 0.91 | 13.23 | 0.2 |
| Example 22 | | 100 | Ave. | 27.0 | 3979.4 | 8.04 | 34.21 | 0.8 |
| | | | Std. | 1.08 | 954.7 | 1.74 | 6.64 | 0.4 |
| Example 23 | | 80 | Ave. | 28.9 | 1708.3 | 3.72 | 22.00 | 0.7 |
| | | | Std. | 0.49 | 293.9 | 0.63 | 1.06 | 0.2 |
| Example 24 | | 100 | Ave. | 26.90 | 1220.4 | 2.47 | 17.42 | 1.0 |
| | | | Std. | 0.31 | 125.2 | 0.24 | 0.86 | 0.2 |

Note:
The average and standard deviation were calculated from the test results of 10 capacitors for each example.

Figure 2A:
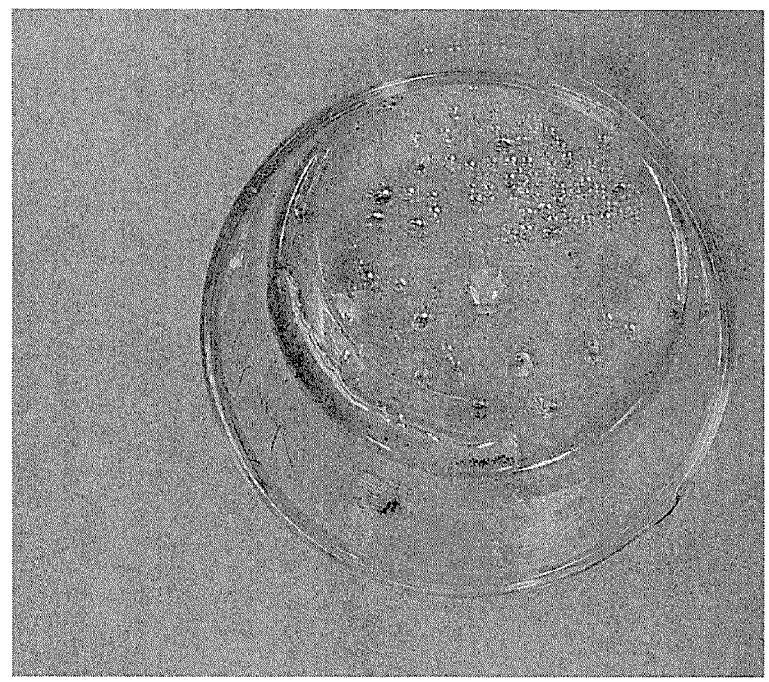
FIG. 2A is a dry film image of the 3,4-ethylenedioxythiophene (EDOT) monomer solution with a nitrogen-containing polymer (polyvinylpyrrolidone) according to Example 1 of the disclosure.
Figure 3A:
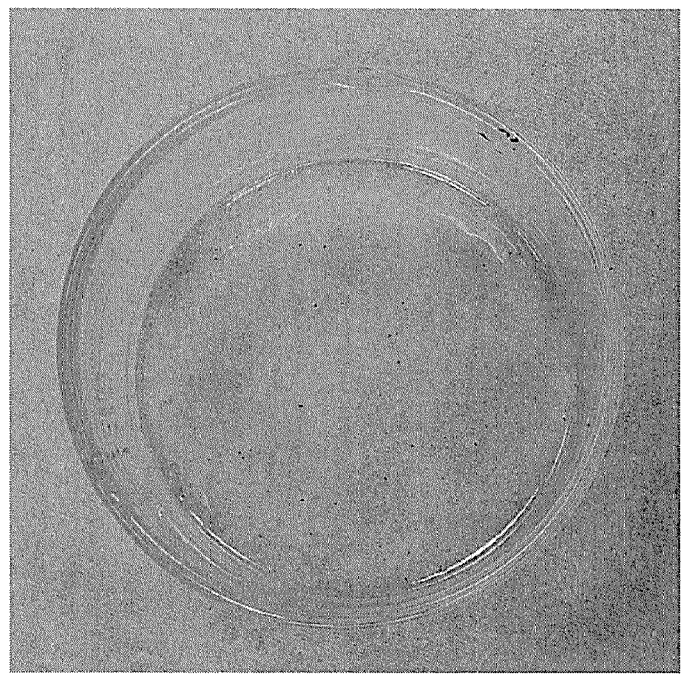
FIG. 3A is a dry film image of the EDOT monomer solution without a nitrogen-containing polymer (polyvinylpyrrolidone) according to Comparative Example 1 of the disclosure.

From the images shown in FIG. 2A and FIG. 3A, the EDOT monomer without a nitrogen-containing polymer (polyvinylpyrrolidone) after drying has a droplet shape (FIG. 3A), while the EDOT monomer with a nitrogen-containing polymer (polyvinylpyrrolidone) is in the form of a transparent film (FIG. 2A). From the images shown in FIG. 2B and FIG. 3B, the conductive polymer polymerized from the EDOT monomer without a nitrogen-containing polymer (polyvinylpyrrolidone) has poor film properties, high brittleness and poor adhesion to the glass, while the conductive polymer polymerized from the EDOT monomer with a nitrogen-containing polymer (polyvinylpyrrolidone) has good film forming property, excellent film properties, and good adhesion to the glass.

The yield of the conductive polymer solid electrolytic capacitor at 35V or higher is usually low due to poor homogeneity of the solid electrolyte. From the test results in Table 2, the addition of an adequate amount of a nitrogen-containing polymer (polyvinylpyrrolidone) during the polymerization process helps to increase the capacitance of a solid electrolytic capacitor, reduce the dissipation factor (DF) value, decrease the interface impedance between the conductive polymer and the oxide film and improve the film forming property. (Note: the DF value represents the situation in which the conductive polymer covers the aluminium oxide, wherein a lower value represents better coverage, and the 100 kHz resistance represents the conductivity of the solid electrolyte.)

Figure 4:
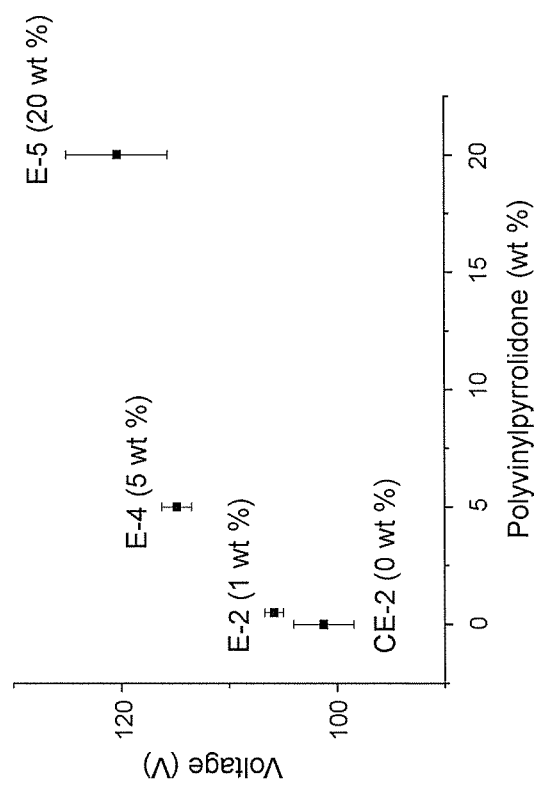
FIG. 4 is a graph illustrating the relationship of the nitrogen-containing polymer amount and the voltage of the withstanding voltage test according to Examples 2-5 and Comparative Example 2 of the disclosure.

From the capacitance test results of Examples 2-5 and Comparative Example 2 in Table 2 and from FIG. 4, when an adequate amount of a nitrogen-containing polymer is added, the rate of capacitance withdrawing of the solid electrolytic capacitor is increased. Besides, the withstanding voltage is going up as the addition of a nitrogen-containing polymer (polyvinylpyrrolidone) is increased, and the yield of a capacitor having a nitrogen-containing polymer is significantly higher than a capacitor without a nitrogen-containing polymer. However, when the amount of the nitrogen-containing polymer added is 20 wt %, even though the overall conductivity and by expansion the capacitance are decreased and the 100 kHz resistance is significantly increased, the yield can be significantly increased. As shown in the test results of Examples 7-9, when an adequate amount of Jeffamine® D-2000 polyoxypropylenediamine is added, the yield of the solid capacitor is higher and the DF of the capacitor is decreased. The decrease in DF represents the film forming property of the conductive polymer composite electrolyte is improved, and the conductivity of the conductive polymer itself represented by the 100 kHz resistance changes with the amount of the nitrogen-containing polymer added. From the test results of Examples 2-14 in Table 2, the addition of an adequate amount of a nitrogen-containing polymer (polyvinylpyrrolidone) helps to increase the yield of the solid electrolytic capacitor, reduce the DF value, and lower the 120 Hz ESR and 100 kHz ESR. It shows that a nitrogen-containing polymer (polyvinylpyrrolidone) with a higher molecular weight is beneficial to improve the film forming property and therefore the conductivity and the yield of the solid capacitor of the conductive polymer.

From the test results in Table 3 and Table 4, in the fabrication of the solid electrolytic capacitor, the addition of a nitrogen-containing polymer in the oxidant can increase the capacitance and reduce the ESR of the 100 kHz regardless of the concentration of the monomer. From the test results of Example 15 and Comparative Example 3, the addition of 0.2 wt % of polyvinylpyrrolidone can increase the capacitance of the capacitor and reduce the ESR of the 100 kHz. From the test results of Example 16 and Comparative Example 4, for the solution of 40 wt % of Fe(III) p-tosylate, the addition of 0.5 wt % of polyvinylpyrrolidone can reduce the ESR of the 100 kHz while maintaining the capacitance. Examples 18-19 and Comparative Examples 5-6 also have the same test results showing that the addition of an adequate amount of the nitrogen-containing polymer in oxidants with different concentrations can maintain or increase the capacitance of the capacitor and reduce the resistance thereof.

From the test results in Table 5 and Table 6, even though the monomer structure is changed or different monomers are mixed in the fabrication of a solid electrolytic capacitor, the yield of each of the solid electrolytic capacitors is 80% or above. On the contrary, without nitrogen-containing polymer (polyvinylpyrrolidone) added in the fabrication process (Comparative Example 2), the yield of the solid electrolytic capacitor is 10%.

In summary, the composition for conductive polymer synthesis having a nitrogen-containing polymer added is beneficial to reduce the interface impedance between the conductive polymer and the oxide film, improve the film forming property of the conductive polymer, and increase the conductivity of the conductive polymer. When the composition is applied to a solid electrolytic capacitor, the properties such as capacitance, reliability, withstanding voltage, heat resistance and lifetime can be effectively increased, and the dissipation factor (DF) value and the 120 Hz equivalent series resistance (ESR) can be decreased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A solid electrolyte mixture, comprising a conductive polymer and a nitrogen-containing polymer, wherein the nitrogen-containing polymer comprises a cyclic nitrogen-containing polymer, a polymer with primary amine group, a polymer with secondary amine group, a polymer with tertiary amine group, a polymer with quaternary ammonium group, or a combination thereof, wherein a weight average molecular weight of the nitrogen-containing polymer ranges from 1,500 to 1,300,000.

2. The solid electrolyte mixture of claim 1, wherein the nitrogen-containing polymer comprises polyvinylpyrrolidone, polyvinylpyridine, poly(diallydimethyl ammonium chloride), polyethyleneimine, polyacrylamide, polyamide, a polymer with primary amine group, a polymer with secondary amine group, a polymer with tertiary amine group, a polymer with quaternary ammonium group, or a combination thereof.

3. The solid electrolyte mixture of claim 1, wherein the conductive polymer comprises a thiophene, a thiophene derivative, a pyrrole, a pyrrole derivative, an aniline, an aniline derivative, or a combination thereof.

4. A conductive polymer solid electrolytic capacitor, comprising a solid electrolyte mixture of claim 1.

5. The conductive polymer solid electrolytic capacitor of claim 4, wherein the electrolyte mixture for an electrolytic capacitor is formed by dipping a capacitor element first in a monomer solution containing a nitrogen compound and then in an oxidant solution.

6. The conductive polymer solid electrolytic capacitor of claim 4, wherein the conductive polymer solid electrolyte is formed by dipping a capacitor element first in a monomer solution and then in an oxidant solution containing a nitrogen compound.

7. The conductive polymer solid electrolytic capacitor of claim 4, wherein the conductive polymer solid electrolyte is formed by dipping a capacitor element in a mixture solution containing a monomer, an oxidant, and a nitrogen compound.

* * * * *